United States Patent
Smith et al.

(10) Patent No.: US 9,733,920 B2
(45) Date of Patent: *Aug. 15, 2017

(54) SYSTEM, METHOD AND COMPUTER PROGRAM PRODUCT FOR ASSOCIATING A PLURALITY OF STORED ELEMENTS WITH A CREATION OF A PATCH

(71) Applicant: salesforce.com, inc., San Francisco, CA (US)

(72) Inventors: Andrew Smith, San Francisco, CA (US); Timothy Kral, San Francisco, CA (US); Simon Toens, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,905

(22) Filed: Jan. 6, 2015

(65) Prior Publication Data

US 2015/0378723 A1 Dec. 31, 2015

Related U.S. Application Data

(63) Continuation of application No. 12/938,318, filed on Nov. 2, 2010, now Pat. No. 8,930,933.

(60) Provisional application No. 61/315,779, filed on Mar. 19, 2010.

(51) Int. Cl.
| G06F 9/44 | (2006.01) |
| G06F 9/45 | (2006.01) |
| G06F 9/445 | (2006.01) |

(52) U.S. Cl.
CPC .......... *G06F 8/65* (2013.01); *G06F 8/30* (2013.01); *G06F 8/71* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

U.S. Appl. No. 12/938,318—Notice of Allowance due Aug. 29, 2014, 8 pages.

(Continued)

*Primary Examiner* — Lewis A Bullock, Jr.
*Assistant Examiner* — Mark Gooray
(74) *Attorney, Agent, or Firm* — Haynes Beffel & Wolfeld LLP; Ernest J. Beffel, Jr.

(57) ABSTRACT

In accordance with embodiments, there are provided mechanisms and methods for associating a plurality of stored elements with a creation of a patch. These mechanisms and methods for associating a plurality of stored elements with a creation of a patch can enable improved patch development for multi-tenant on-demand database systems, improved patch flexibility, etc.

19 Claims, 6 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,930,933 B2 | 1/2015 | Smith et al. |
| 2001/0032154 A1* | 10/2001 | Schummer ............ G06Q 30/06 705/30 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0099563 A1* | 7/2002 | Adendorff ......... G06F 17/30563 705/7.11 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0075001 A1* | 4/2006 | Canning .................. G06F 8/65 |
| 2006/0168577 A1* | 7/2006 | Melo ..................... G06F 8/71 717/168 |

(56) References Cited

U.S. PATENT DOCUMENTS

| | | |
|---|---|---|
| 2006/0206834 A1 | 9/2006 | Fisher et al. |
| 2007/0169101 A1 | 7/2007 | Konersmann et al. |
| 2007/0300205 A1* | 12/2007 | Scian ............... G06F 8/68 717/106 |
| 2008/0209503 A1* | 8/2008 | Hess ............... G06F 21/10 726/1 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

OTHER PUBLICATIONS

U.S. Appl. No. 12/938,318—Office Action dated Nov. 26, 2012, 13 pages.
U.S. Appl. No. 12/938,318—Response to Office Action dated Nov. 26, 2012 filed Mar. 26, 2013, 14 pages.
U.S. Appl. No. 12/938,318—Office Action dated Jul. 8, 2013, 16 pages.
U.S. Appl. No. 12/938,318—Response to Office Action dated Jul. 8, 2013 filed Sep. 24, 2013, 13 pages.
U.S. Appl. No. 12/938,318—Office Action dated Mar. 27, 2014, 18 pages.
U.S. Appl. No. 12/938,318—Response to Office Action dated Mar. 27, 2014 filed Jun. 25, 2014, 10 pages.
U.S. Appl. No. 60/828,192, filed Oct. 4, 2006.
U.S. Appl. No. 61/315,779, filed Mar. 19, 2010.

* cited by examiner

SYSTEM, METHOD AND COMPUTER PROGRAM PRODUCT FOR ASSOCIATING A PLURALITY OF STORED ELEMENTS WITH A CREATION OF A PATCH

CLAIM OF PRIORITY

This application is a continuation of U.S. application Ser. No. 12/938,318 entitled "System, Method and Computer Program Product for Associating A Plurality of Stored Elements with a Creation of a Patch" filed on Nov. 2, 2010, (SFC1P092/273US), now U.S. Pat. No. 8,930,933, issued Jan. 6, 2015, which claims the benefit of U.S. Provisional Patent Application 61/315,779, entitled "Packaging Patches," by Smith et al., filed Mar. 19, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to installing code, and more particularly to developing patches for installed code.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional multi-tenant on-demand database systems, it may be desirable to create a patch for a version of code installed within the multi-tenant on-demand database. For example, a developer may create and release a patch for a particular application installed within the multi-tenant on-demand database. Unfortunately, conventional patch development systems have been associated with various limitations.

Just by way of example, traditional methods of developing a patch for code may address the latest version of the code that has been installed within the multi-tenant on-demand database, even if the patch is for an earlier version of the code. This may force users who utilize versions of code earlier than the latest version to install the latest version of code to obtain patches for their code. As such, the only way to provide bug fixes to customers under conventional systems may be to ask them to upgrade to another version of code, which a risk averse customer may be reluctant to do. Accordingly, it is desirable to provide techniques that increase the flexibility of patch development.

BRIEF SUMMARY

In accordance with embodiments, there are provided mechanisms and methods for associating a plurality of stored elements with a creation of a patch. These mechanisms and methods for associating a plurality of stored elements with a creation of a patch can enable improved patch development for multi-tenant on-demand database systems, improved patch flexibility, etc.

In an embodiment and by way of example, a method for associating a plurality of stored elements with a creation of a patch is provided. In one embodiment, creation of a first version of code to be installed in a multi-tenant on-demand database system is identified. Additionally, a plurality of elements associated with the creation of the first version of code is stored. Further, creation of a patch associated with the first version of code is identified. Further still, the stored plurality of elements is associated with the creation of the patch. In another embodiment, creation of a first version of code to be installed within a multi-tenant on-demand database system is identified. Additionally, creation of a second version of code to be installed within the multi-tenant on-demand database system is identified. Further, creation of a patch associated with the first version of the code is enabled after the creation of the second version of the code.

While one or more implementations and techniques are described with reference to an embodiment in which enabling an aspect required with respect to code to be installed within a multi-tenant on-demand database system is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for associating a plurality of stored elements with a creation of a patch.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for associating a plurality of stored elements with a creation of a patch will be described with reference to example embodiments.

Figure 1:
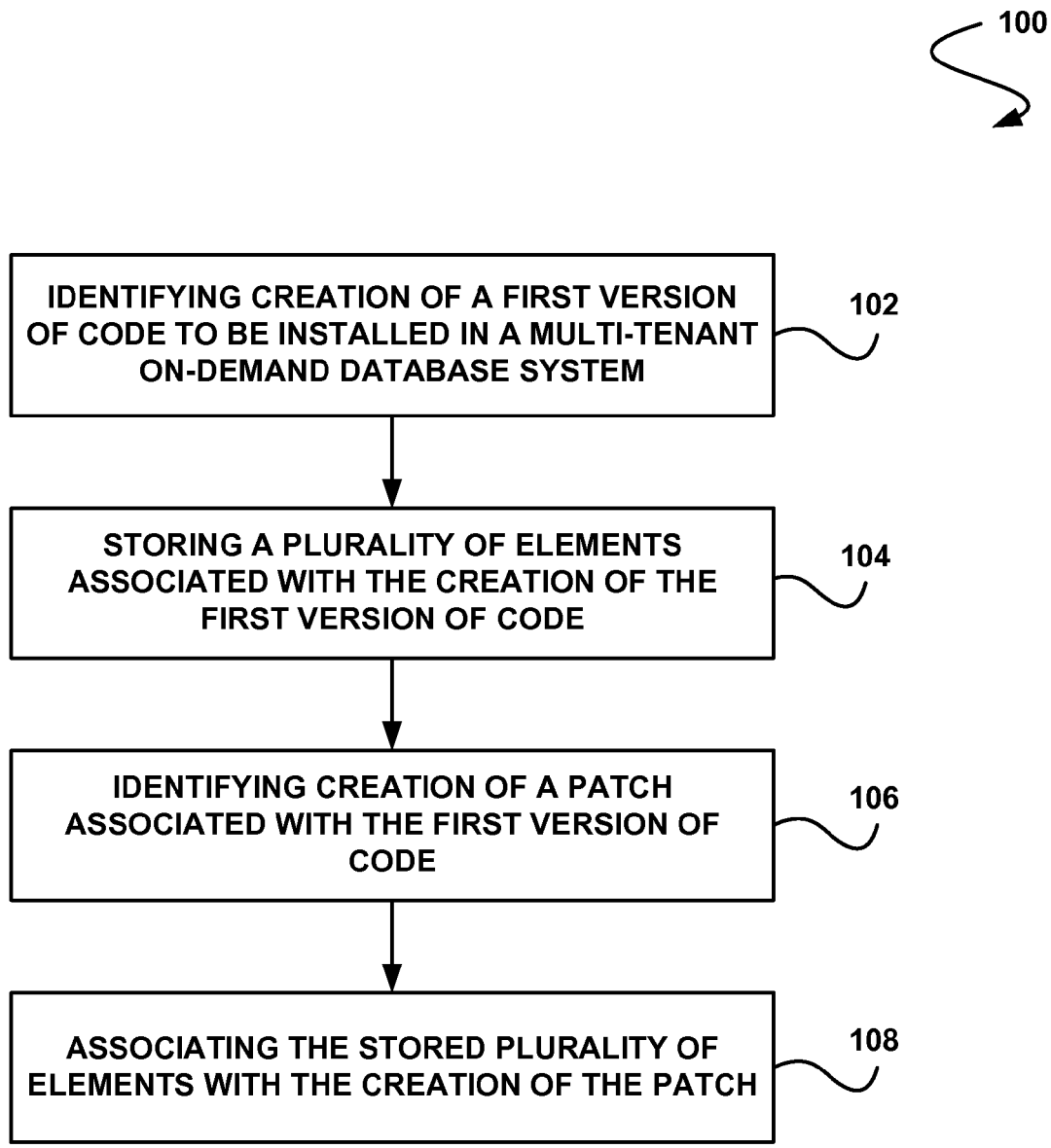
FIG. 1 illustrates a method for associating a plurality of stored elements with a creation of a patch, in accordance with one embodiment.

FIG. 1 illustrates a method 100 for associating a plurality of stored elements with a creation of a patch, in accordance with one embodiment. As shown in operation 102, creation of a first version of code to be installed in a multi-tenant on-demand database system is identified. With respect to the present description, the code may include any data (e.g., one or more files, etc.) that is capable of being installed within the multi-tenant on-demand database system. For example, the code may include a package (e.g., one or more applications, etc.).

In another embodiment, the code may be associated with a platform of the multi-tenant on-demand database system. For example, the code may be drafted in a programming language associated with the multi-tenant on-demand database system. In another example, the code may be drafted in order to integrate with the platform of the multi-tenant on-demand database system.

Additionally, in one embodiment, the code may be drafted by an entity associated with the multi-tenant on-demand database system. For example, the code may be drafted by a partner of the multi-tenant on-demand database system, a developer associated with the multi-tenant on-demand database system, etc. Further, in another embodiment, the code may provide a service in association with the multi-tenant on-demand database system. In another embodiment, the code may include an enhancement of a service provided by the multi-tenant on-demand database system.

It should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Additionally, in one embodiment, the first version of the code may include a particular release of the code. For example, the first version of the code may include an initial release of the code, a subsequent release of the code after the initial release of the code, etc. In yet another embodiment, the first version of the code may be associated with a workspace. For example, a first workspace (e.g., an organization, work interface, etc.) may be used to create the first version of the code.

Further, as shown in operation 104, a plurality of elements associated with the creation of the first version of code is stored. In one embodiment, the plurality of elements may have been used to create the first version of code. For example, the plurality of elements may include one or more version artifacts. In another example, the plurality of elements may include a state of the first version of code. For instance, the plurality of elements may include one or more custom objects associated with the first version of code, one or more pages associated with the first version of code, apex code associated with the first version of code, triggers associated with the first version of code, one or more elements of metadata, one or more settings, etc.

Additionally, in one embodiment, the plurality of elements may be extracted from the workspace used to create the first version of code. For example, the plurality of elements may be copied from the workspace. In another embodiment, the plurality of elements may be extracted and/or stored using an application programming interface (API) (e.g., a metadata API, etc.). Further, in one embodiment, the plurality of elements may be stored in one or more formats (e.g., Extensible Markup Language (XML), etc.). In another embodiment, the plurality of elements may be stored in a compressed format (e.g., a ZIP format, etc.).

Further still, in one embodiment, the plurality of elements may be stored on a disk (e.g., in a local database, a remote database, etc.). In another embodiment, the plurality of elements may be stored using cloud computing (e.g., utilizing storage of the cloud, etc.). Of course, however, the plurality of elements may be stored in any manner.

Also, as shown in operation 106, creation of a patch associated with the first version of code is identified. In one embodiment, the patch may improve one or more elements of the first version of code. For example, the patch may fix an error in the first version of code, may improve upon the first version of code, etc. In another embodiment, the patch may be added to the first version of code. For example, the patch may be integrated with the first version of the code.

Additionally, in one embodiment, the patch may be associated with a workspace. For example, an instance of a workspace (e.g., an organization, work interface, etc.) may be used to create the patch. In another embodiment, the workspace may include a shell workspace (e.g., a blank workspace, etc.). Further, in another embodiment, a second version of the code to be installed within the multi-tenant on-demand database system may be created after the creation of the first version of the code but before the patch is created. In yet another embodiment, the second version of the code may be associated with a second workspace. For example, a second instance of the workspace may be used to create the second version of the code, where the second workspace is different from the first workspace used to create the first version of the code.

Furthermore, as shown in operation 108, the stored plurality of elements is associated with the creation of the patch. In one embodiment, the plurality of elements may be retrieved from where they were stored. Additionally, in another embodiment, the plurality of elements may be associated (e.g., integrated, etc.) with the workspace associated with the patch. For example, the plurality of elements may be deployed into the blank workspace associated with the patch. In this way, the developer of the patch may be able to create the patch for the first version of the code, even though the second version of the code has already been created. Additionally, the patch for the first version of the code may be created utilizing a workspace that is similar to the workspace used during the creation of the first version of code.

Figure 2:
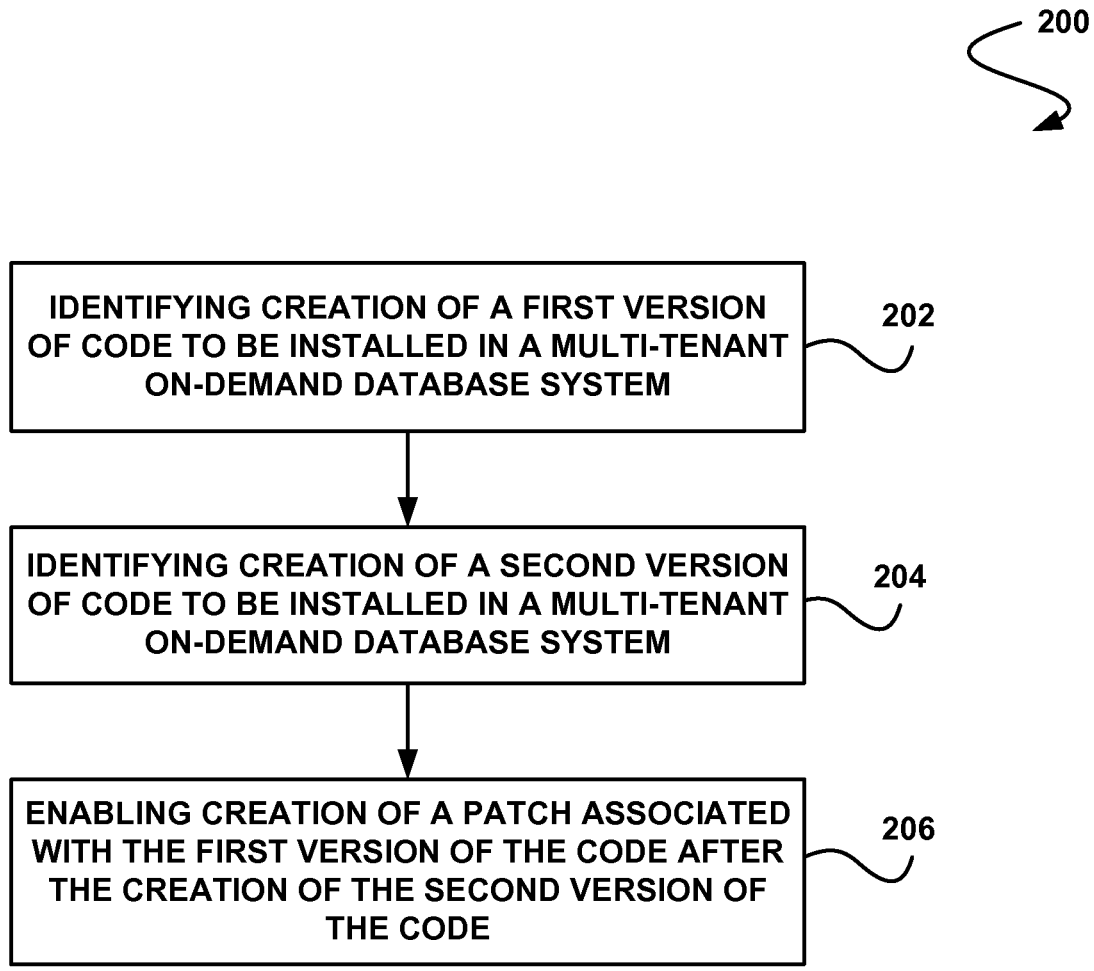
FIG. 2 illustrates a method for enabling creation of a patch associated with a first version of code, after creation of a second version of the code, in accordance with another embodiment.

FIG. 2 illustrates a method 200 for enabling creation of a patch associated with a first version of code, after creation of a second version of the code, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, creation of a first version of code to be installed within a multi-tenant on-demand database system is identified. In one embodiment, the first version of the code may be created by a developer utilizing an instance of a workspace. In another embodiment, the first version of code may be associated with a version number. For example, the first version of code may be designated "version 1.0," etc.

Additionally, as shown in operation 204, creation of a second version of the code to be installed within the multi-tenant on-demand database system is identified. In one embodiment, the second version of the code may be created by the developer (or a developer other than the developer who created the first version of code) utilizing an instance of a workspace other than the instance of the workspace utilized to create the first version of the code. In another embodiment, the second version of code may be associated with a version number. For example, the second version of code may be designated "version 2.0," etc.

Further, as shown in operation 206, creation of a patch associated with the first version of the code is enabled after the creation of the second version of the code. In one embodiment, enabling the creation of the patch may include extracting and storing one or more elements associated with the creation of the first version of code. Additionally, the one or more elements may then be associated with the creation of the patch. Additionally, the patch may be associated with an extension of the version number of the first version of code. For example, the patch may be designated "version 1.0.1," etc. In another embodiment, the patch associated with the first version of the code may branch off the first version of the code (e.g., using horizontal branching, etc.), and may not branch off the second version of the code (e.g., using vertical branching, etc.).

Figure 3:
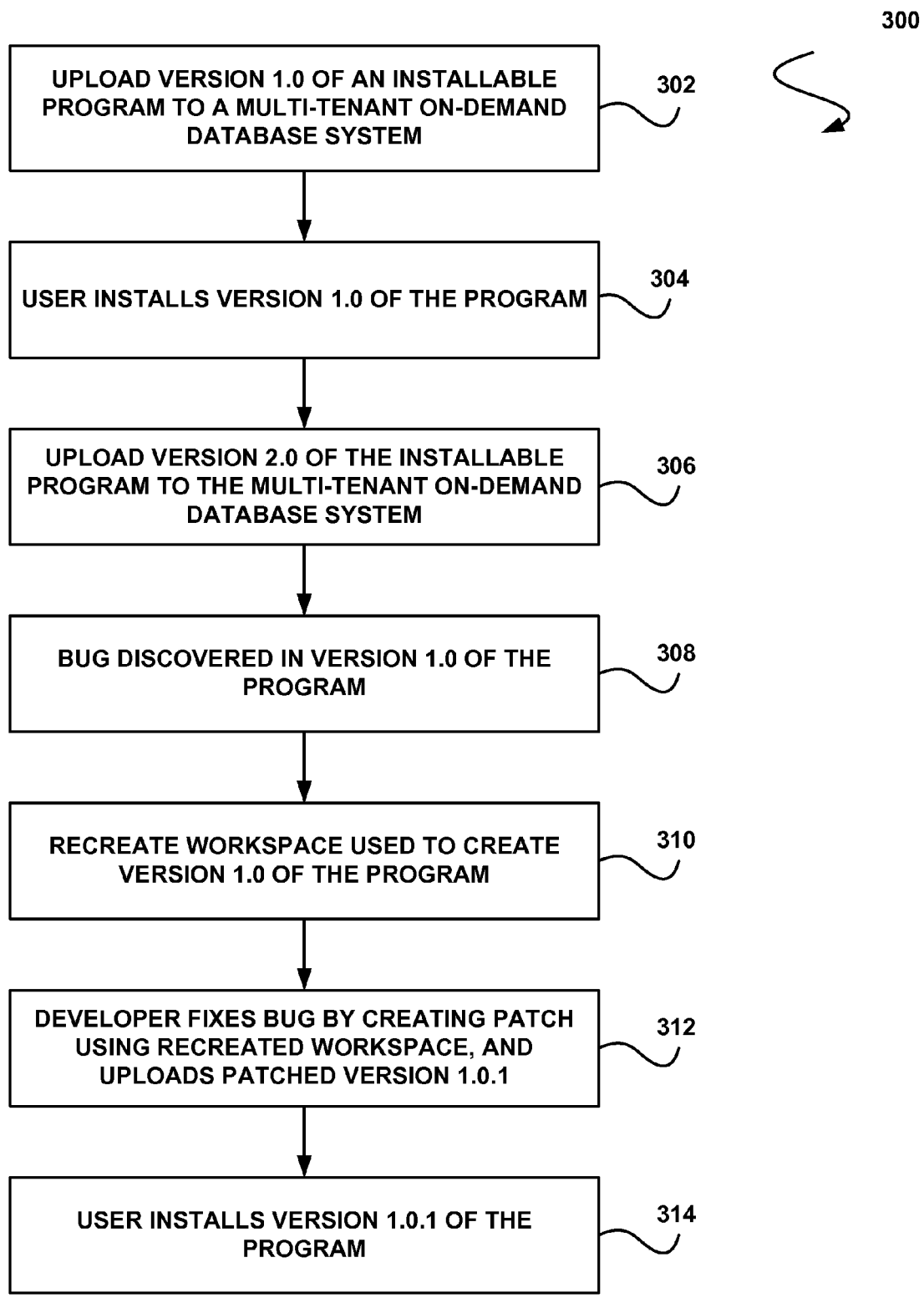
FIG. 3 illustrates a method for updating a version of an application with a patch, in accordance with yet another embodiment.

FIG. 3 illustrates a method 300 for updating a version of an application with a patch, in accordance with yet another embodiment. As an option, the present method 300 may be carried out in the context of the functionality of FIGS. 1-2. Of course, however, the method 300 may be carried out in any desired environment. Again, the aforementioned definitions may apply during the present description.

As shown in operation 302, version 1.0 of an installable program is uploaded to a multi-tenant on-demand database system. In one embodiment, a developer may create version 1.0 of the program in a first workspace, and upload version 1.0 of the program to the multi-tenant on-demand database system for subsequent installation of the program by a user. Additionally, as shown in operation 304, a user installs version 1.0 of the program. For example, the user may access an account of the multi-tenant on-demand database system and request that version 1.0 of the program is installed within that account.

Further, as shown in operation 306, version 2.0 of the installable program is uploaded to the multi-tenant on-demand database system. In one embodiment, the developer may create version 2.0 of the program in a second workspace other than the first workspace, and upload version 2.0 of the program to the multi-tenant on-demand database system for subsequent installation of the program by a user. Further still, as shown in operation 308, a bug is discovered in version 1.0 of the program. In one embodiment, the developer may discover the bug in version 1.0. In another embodiment, one or more users who have installed version 1.0 of the program may discover the bug and alert the developer (e.g., via an electronic mail message, etc.).

Also, as shown in operation 310, the workspace used to create version 1.0 of the program is recreated. In one embodiment, one or more elements associated with the workspace used by the developer to create version 1.0 of the program may be extracted and saved when the developer originally created version 1.0 of the program. Additionally, these elements may then be associated with a new workspace in order to recreated the workspace used to create version 1.0 of the program.

In addition, as shown in operation 312, the developer fixes the bug by creating a patch using the recreated workspace, and uploads patched version 1.0.1 of the program to the multi-tenant on-demand database system for subsequent installation by the user. Furthermore, as shown in operation 314, the user that installed version 1.0 of the program installs version 1.0.1 of the program. In one embodiment, version 1.0.1 of the program may be manually installed by the user, may be automatically installed based on one or more predetermined criteria, etc.

In this way, a workspace may be created to assist in developing an earlier version of the program than the latest available version. This workspace may replicate the development state in the workspace that has all the elements associated with version 1.0 of the program (e.g., the state in which version 1.0 was created). Further, the workspace may enable the developer to release a patch utilizing horizontal branching (e.g., from version 1.0 to 1.0.1) instead of vertical branching (e.g., from version 1.0 to version 1.3), such that the patch is branched off of the version of the program that has the bug.

Figure 4:
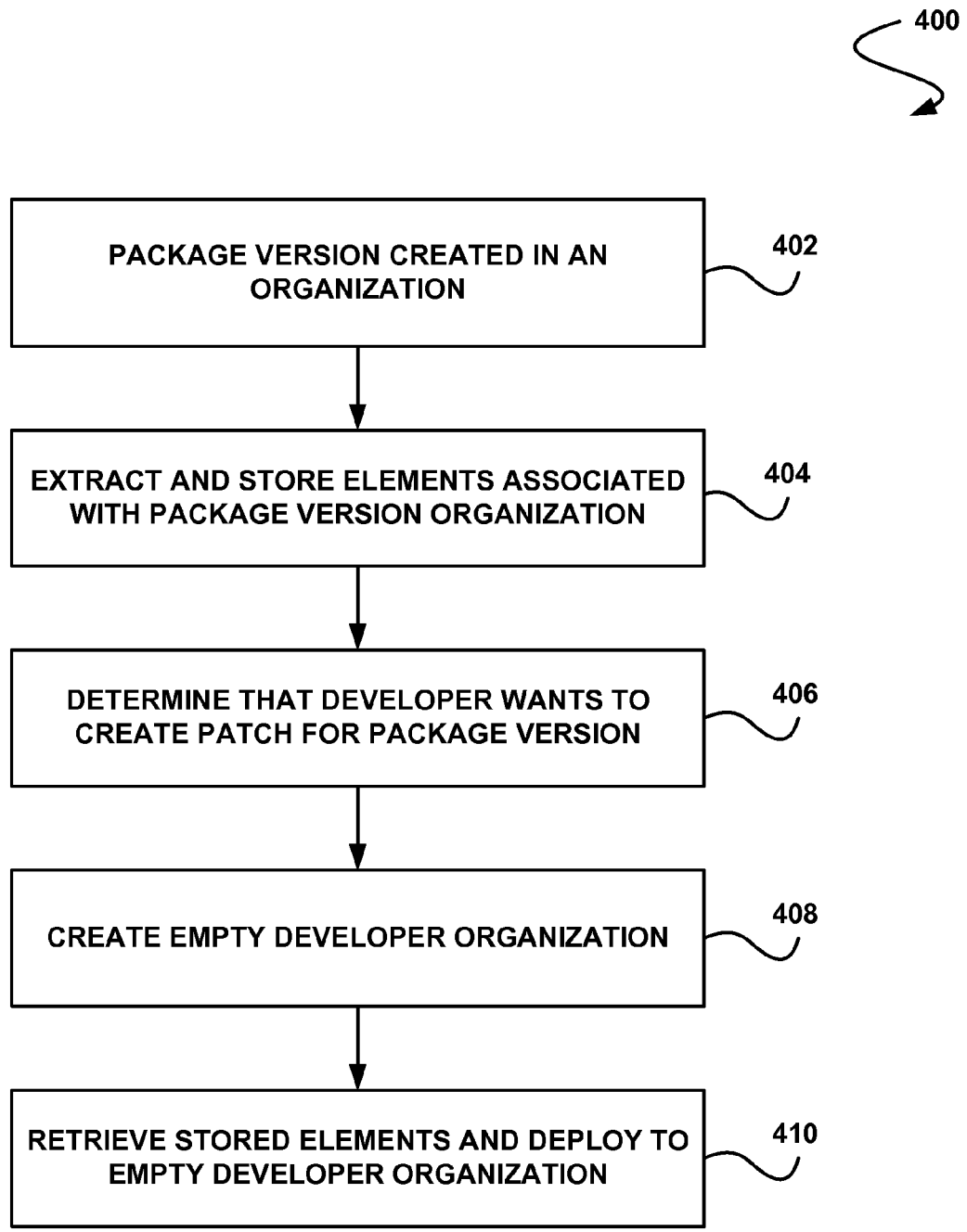
FIG. 4 illustrates a method for creating a developer organization for patch development, in accordance with one embodiment.

FIG. 4 illustrates a method 400 for creating a developer organization for patch development, in accordance with yet another embodiment. As an option, the present method 400 may be carried out in the context of the functionality of FIGS. 1-3. Of course, however, the method 400 may be carried out in any desired environment. Again, the aforementioned definitions may apply during the present description.

As shown in operation 402, a version of a package is created by a developer in an organization. For example, the developer may create the version of the package in the main developer folder of a multi-tenant on-demand database system. Additionally, as shown in operation 404, elements associated with the package version organization are extracted and stored. For example, the elements may include one or more settings (e.g., customer settings, etc.), one or more licenses, one or more values (e.g., user values, etc.), etc.

In another example, the elements may include one or more organizational level features (e.g., an organizational shape, etc.). For example, the elements may include features enabled in the organization that the package depends on (e.g., subscription features, features that have to be specifically enabled, etc.) In another example, the elements may include feature requirements of the package data. Further, in one embodiment, the elements may include one or more package level features. For example, the elements may include package version artifacts stored in XML data, one or more elements of metadata (e.g., in a zip file), etc.

Additionally, as shown in operation 406, it is determined that the developer wants to create a patch for the version of the package. For example, the developer may select one or more icons of the multi-tenant on-demand database system, input one or more requests to the multi-tenant on-demand database system, etc. In response, as shown in operation 408, a new developer organization is created. For example, an empty "shell" organization may be created within the multi-tenant on-demand database system from a main developer folder.

Further, as shown in operation 410, the stored elements associated with the package version workspace are retrieved and deployed to the new developer organization. In one embodiment, organizational level features may be copied to the organization first, followed by package level features. In another embodiment, feature requirements may be tracked in the package data, and if one or more of the features are not enabled, an error message may be presented to the developer. In another embodiment, the package level features may be deployed into the developer organization as metadata in a zip file (e.g., using a metadata API, etc.).

In another embodiment, name sharing may be enabled. For example, the new developer organization used to create the patch may have the same name as the organization used to create the package version. In another embodiment, one or more manual adjustments may be allowed by the developer. For example, the developer may be allowed to access and alter the new organization so that the developer can log in and adjust the new organization (e.g., to fix any errors associated with deployment of the stored elements, to roll back the organization to avoid one or more bugs, etc.).

In this way, the deployment of the stored elements into the new developer organization used to patch the version of the package may enable the new developer organization to look and act the same as the workspace used by the developer to create the version of the package. In one embodiment, this may be performed in an on-demand manner whenever the developer wishes to create a patch for a package version.

To further illustrate, consider a patch development organization (patch org) that allows a partner as a part of a large push upgrade project to upgrade their customers using a push model. In one embodiment, the patch org is a salesforce.com, inc. organization. In other embodiments, it may be an organization hosted by another service provider.

In one embodiment, the patch org includes a workspace, as described above, that allows the partner to branch previous versions of a released managed package. For instance, the patch org provides the partner with a workspace in which they can create and upload patch fixes for their packages.

In one embodiment, packages may include applications that partners develop on the multi-tenant on-demand database system platform. In another embodiment, package development and publication may be sequential (i.e., the partner may make changes until satisfied, then may upload a released version of the package which can be installed by customers). The partner may then make more changes to the package and may upload another released version, which customers may install, and so on.

Over time, the partner may end up with a fragmented customer base on different versions of the application. Patch orgs may solve this problem by allowing a partner to create a targeted fix (a patch) for a previously released version by re-creating the state of the development organization as it existed at the time the previous version was uploaded. Customers may then install this patch and may not be forced to upgrade to a later version.

In source control terms, a patch org may be an on-demand branch, meaning the patch org may be in the same state as if forked from the main development branch at the time a particular package version was uploaded. For example, a partner may have created various versions of an application. Assume that version 6.0 of the application fixes a critical bug introduced in version 3.0. A customer on version 4.0 may not need to upgrade all the way to version 6.0 to get this bug fix, since by using a patch org, the partner can create a targeted patch for version 4.0, 4.0.1. In this example, the customer(s) on version 4.0 can install the 4.0.1 patch to fix the bug.

Additionally, in one embodiment, a metadata API (e.g., mdAPI, etc.) may support legacy package versions. In this or another embodiment, the mdAPI itself may be versioned. In another embodiment, package upload and install may rely on the mdAPI to create a package version artifact (e.g., the metadata zip, etc.). In another embodiment, this artifact may be used to drive patch org creation using the mdAPI.

Further, in another embodiment, a patch org may be created with the mdAPI by first signing up a barebones shell organization with the proper organization permissions and preferences (e.g., dev organization shape, etc.), and then deploying the stored elements (e.g. version artifacts) as developed metadata. In one embodiment, deploying the stored elements may involve work in five areas, although, more or less work may be involved. In this example, the first area of work is the uploading the package, which may include defining, at upload time, the shape of the base development organization in order to create a patch org with the proper parameters. The second area can include a sign-up step, which creates the development organization shell and modifies it to fit the shape of the base organization associated with the stored elements and a snapshot of the development organization's shape.

The third area of work may include the steps and systems necessary to deploy a package. In one embodiment, deploying a package may include deploying metadata from the stored elements associated with a package as developed metadata once the patch org is up. In another embodiment, prior to this, there may need to be some tweaking of the org that does not involve permissions or preferences (e.g. Entity Org Shape, etc.). The fourth area of work may include "blacktab" support. In one embodiment, blacktab support may include the ability to access and modify the permissions and preferences of a signed-up patch org or to restart the sign-up process in the cases where package deploy fails due to organization shape. The fifth area of work includes maintaining developer control over the patch org. For example, in one embodiment, this may include limiting what developers are allowed to do within the org once a patch org has been successfully created.

In one embodiment, at package upload time, a snapshot of the development organization's shape and the user license of the uploading user are taken. These snapshots may be serialized and added as stored elements associated with a package. By doing this, the stored elements may be replicated via fileforce replication. Also, this may mean that patch org creation only depends on one replicated stored element instead of two.

It should be noted that development organization shape may be different from package organization's shape. The development organization shape may describe the organization permissions and preferences present in a whole development organization (e.g. the base dev org or the patch dev org, etc.). In one embodiment, the package organization shape may describe the org permissions and preferences needed in a subscriber org in order to install or upgrade a particular package version. Package organization shape may play a role in patch org creation.

Further, in one embodiment, the mdAPI may support retrieval of Org Settings.

Also, in another embodiment, at sign-up the current main development organization shape may be copied to the patch org. Additionally, one or more things that may need to happen during signup. For example, a new organization may be created with a new user (e.g., copied from the signing up user, etc.) and with the proper patch org permissions. Additionally, the new organization may be provisioned so that parameters and preferences match those of the main development organization. Further, static provisioning may be performed based on the fact that this is a patch dev org. In another embodiment, the task of creating the new org may be accomplished using a handler stack (e.g. in a salesforce.com implementation a call is made to the EDITION_OR-G_ROW_ONLY_SIGNUP_HANDLERS). However, there may need to be more sign up handlers added on to the end to perform the other tasks.

In yet another embodiment, an organization may be identified as a patch org based on the database state in the organization row (specifically the parent_org_id column). For example, the parent_org_id may be replaced by an identifier that identifies an organization as a patch org. The new org permission may allow us to more easily provision patch orgs and may fit into the org permission dependency tree.

There are some permissions and preferences that may be on or off despite the base development organization shape. Table 1 illustrates examples of permissions and preferences that may be on or off in a salesforce.com specific implementation. Of course, it should be noted that the examples shown in Table 1 are set forth for illustrative purposes only, and thus should not be construed as limiting in any manner.

TABLE 1

| Perm/Pref | Value | New? |
| --- | --- | --- |
| OrgPermissionsBit.deprecateSchema | Off | Yes |
| OrgPermissionsBit.packagingImport | Off | No |
| OrgPermissionsBit.patchDevOrg | On | Yes |

In another embodiment, once a patch org has been successfully signed up and provisioned, metadata in the package version artifact may be deployed into it as developed metadata. For example, in a salesforce.com implementation, the PackageInstallEngine may be instantiated to handle package deploy for patch orgs. This new instantiation may be tasked with doing one or more of setting up any non-provisioned package org shape, deploying the metadata, performing post copy DML operations (e.g., for extensions and id mappings, etc.), connecting AMPM foreign keys, sending a success or failure email, etc.

Additionally, in one embodiment, package org shapes may be handled during signup when the developer organization shape is copied from the base development organization. However, there may be some exceptions, examples of which are detailed below. Table 2 illustrates various possible feature org shape exceptions in a salesforce.com specific implementation. Of course, it should be noted that the exceptions shown in Table 2 are set forth for illustrative purposes only, and thus should not be construed as limiting in any manner.

TABLE 2

| Feature Name | Feature Java Class | Access Function (if any) | Check |
| --- | --- | --- | --- |
| Campaign | CampaignOrgFeature | PermissionsUtil.orgHasCampaignLicense | getOrgInfo( ).getNumMarketingLicenses( ) > 0 |
| MultiCurrency | MultiCurrencyOrgFeature | | getOrgInfo( ).isMultiCurrencyEnabled( ) |
| TerritoryManagement | TerritoryManagementOrgFeature | ForecasatAccessChecks.orgHasEnabledTM | getOrgInfo( ).isTMEnabled( ) && OrgPermissions.TerritoryManagement |

In another embodiment, no entity org shape may be handled at signup time and all of it may have to be handled at deploy time. Table 3 illustrates various possible entity organization shape exceptions, according to one embodiment. Of course, it should be noted that the exceptions shown in Table 3 are set forth for illustrative purposes only, and thus should not be construed as limiting in any manner.

TABLE 3

| Entity Feature Name | Feature Java Class | Check | Entities |
|---|---|---|---|
| FieldHistoryTracking | FieldHistoryTrackingOrgFeature | (ei.isStandard( ) && (ei.getEntityCommon.isHistoryTrackedByDefault( ) \|\| ei.getEntityCommon( ).isHistoryTrackingPrefEnabled( ))) \|\| (ei.isCustom( ) && ei.trackHistory( )) | Account Case Contact ContentVersion Contract Lead Opportunity Solution |
| RecordType | RecordTypeOrgFeature | getUddInfo( ).getEntityInfoById(Entities.RecordType) != null | Account Campaign CampaignMember Case Contact ContentVersion Contract Event Lead Opportunity Product2 Solution Task |
| Sharing | SharingOrgFeature | ei.getSharingModel( ) == SharingModelEnum.PRIVATE_SHARE | Account Campaign Case Contact Lead Opportunity |

In yet another embodiment, patch orgs may be used for a limited amount of time (e.g., 30 days, etc.). In another embodiment, if the partner wants to patch the same version again, the patch org may be recreated and the latest patch may be uploaded from that patch org. For example, Patch 1.0->1.01 in dev. 1.01 and 1.0.2 may be uploaded from patch org. If 30 days pass, the patch org may be deleted. Further, if the developer then wants to release 1.0.3, the patch org 1.0.2 may be recreated.

Additionally, in one embodiment, a package deploy into the patch org may not initially succeed. In one embodiment, a blacktab page may be created to try and fix the signed up patch dev org. At a minimum, the blacktab page may be able to easily turn on/off org permissions and preferences, adjust non-provisioned package org shape (e.g. create record types, etc.), retry the package deployment, etc.

In another embodiment, because a development organization shape may be copied from a base organization, patch org developers may not be able to do anything in a patch org that is forbidden in the base organization. They may be further restricted by the static permissions setup during signup.

Table 4 illustrates an exemplary provisioned package org shape. Of course, it should be noted that the provisioned package org shape shown in Table 4 is set forth for illustrative purposes only, and thus should not be construed as limiting in any manner.

TABLE 4

| Feature Name | Feature Java Class | Access Function(if any) | Check |
|---|---|---|---|
| AccountTeam | AccountTeamOrgFeature | SalesAccessChecks.-orgHasAccTeamSellingOn | OrgPermissions.AccountsAndContacts && OrgPreferences.AccountTeamSelling |
| AlwaysTriggerOppSaveLogic | AlwaysTriggerOppSaveLogicOrgFeature | | OrgPreferences.alwaysTriggerOppSaveLogic |
| Answers | AnswersOrgFeature | AnswersAccessChecks.-orgHasAnswersEnabled | OrgPermissions.Answers && OrgPreferences.AnswersEnabled |
| B2C | B2COrgFeature | SalesAccessChecks.orgHasB2C | OrgPermissions.B2C |
| Content | ContentOrgFeature | ContentAccessChecks.-orgHasContentDocuments | OrgPermissions.ContentExchange |
| CustomerSuccessPortal | CustomerSuccessPortalOrgFeature | | OrgPreferences.customerSuccessPortal |
| Division | DivisionOrgFeature | | OrgPermissions.division |
| Email2Case | Email2CaseOrgFeature | MessagingAccessChecks.-orgEnabledEmailToCase | OrgPermissions.HasEmailToCase && OrgPreferences.EmailToCaseEnabled |
| EncryptedFields | EncryptedFieldsOrgFeature | | OrgPermissions.encryptedCustomFields |
| FindSimilarOpps | FindSimilarOppsOrgFeature | | OrgPreferences.findSimilarOpportunities |
| Forecasts | ForecastsOrgFeature | ForecastAccessChecks.-orgHasEitherForecastTabAccess | OrgPermissions.Forecasts |
| GoogleDoc | GoogleDocOrgFeature | | OrgPermissions.googleDocsApi && OrgPreferences.googleDocsEnabled |
| Ideas | IdeasOrgFeature | IdeasAccessChecks.-orgHasIdeasEnabled | OrgPermissions.Ideas && OrgPreferences.IdeasEnabled |

TABLE 4-continued

| Feature Name | Feature Java Class | Access Function(if any) | Check |
|---|---|---|---|
| IdeasStandardControllers | IdeasStandardControllersOrgFeature | | OrgPermissions.ideaStandardControllers |
| Knowledge | KnowledgeOrgFeature | KnowledgeAccessChecks.-isKnowledgeEnabled | OrgPermissions.Knowledge && OrgPreferences.KnowledgeEnabled |
| OpportunitySalesTeam | OpportunitySalesTeamOrgFeature | SalesAccessChecks.-orgHasOppTeamSellingOn | OrgPermissions.Opportunities && OrgPreferences.OppTeamSelling |
| OpportunitySplits | OpportunitySplitsOrgFeature | | OrgPreferences.opportunitySplitsEnabled |
| PartnerNetwork | PartnerNetworkOrgFeature | | OrgPreferences.partnerNetwork |
| PartnerNetworkSurvey | PartnerNetworkSurveyOrgFeature | S2SAccessChecks.-hasPartnerNetworkSurveyEnabled | OrgPermissions.PartnerNetworkSurvey && OrgPreferences.PartnerNetworkSurvey |
| PRM | PRMOrgFeature | | OrgPreferences.enablePRM |
| Product | ProductOrgFeature | | OrgPermissions.Products |
| ProductSchedule | ProductScheduleOrgFeature | SalesAccessChecks.-orgHasRevAnnuity \|\| SalesAccessChecks.-orgHasQtyAnnuity | (OrgPermissions.Schedules && OrgPreferences.RevenueSchedules) \|\| (OrgPermissions.Schedules && OrgPreferences.QuantitySchedules) |
| Quotes | QuotesOrgFeature | SalesAccessChecks.orgHasQuotes | OrgPermissions.Quotes && OrgPreferences.QuotesEnabled |
| Teams | TeamsOrgFeature | PermissionsUtil.hasTeams | OrgPermissions.teams |
| UseOldOppSaveBehavior | UseOldOppSaveBehaviorOrgFeature | | OrgPreferences.alwaysTrigger OppSaveLogic |
| Workflow | WorkflowOrgFeature | WorkflowAccessChecks.-orgHasWorkflow( ) && WorkflowAccessChecks.-orgHasWfOutboundMessaging( ) | OrgPermissions.WorkflowEnabled && OrgPermissions.WfOutboundMessaging |

System Overview

Figure 5:
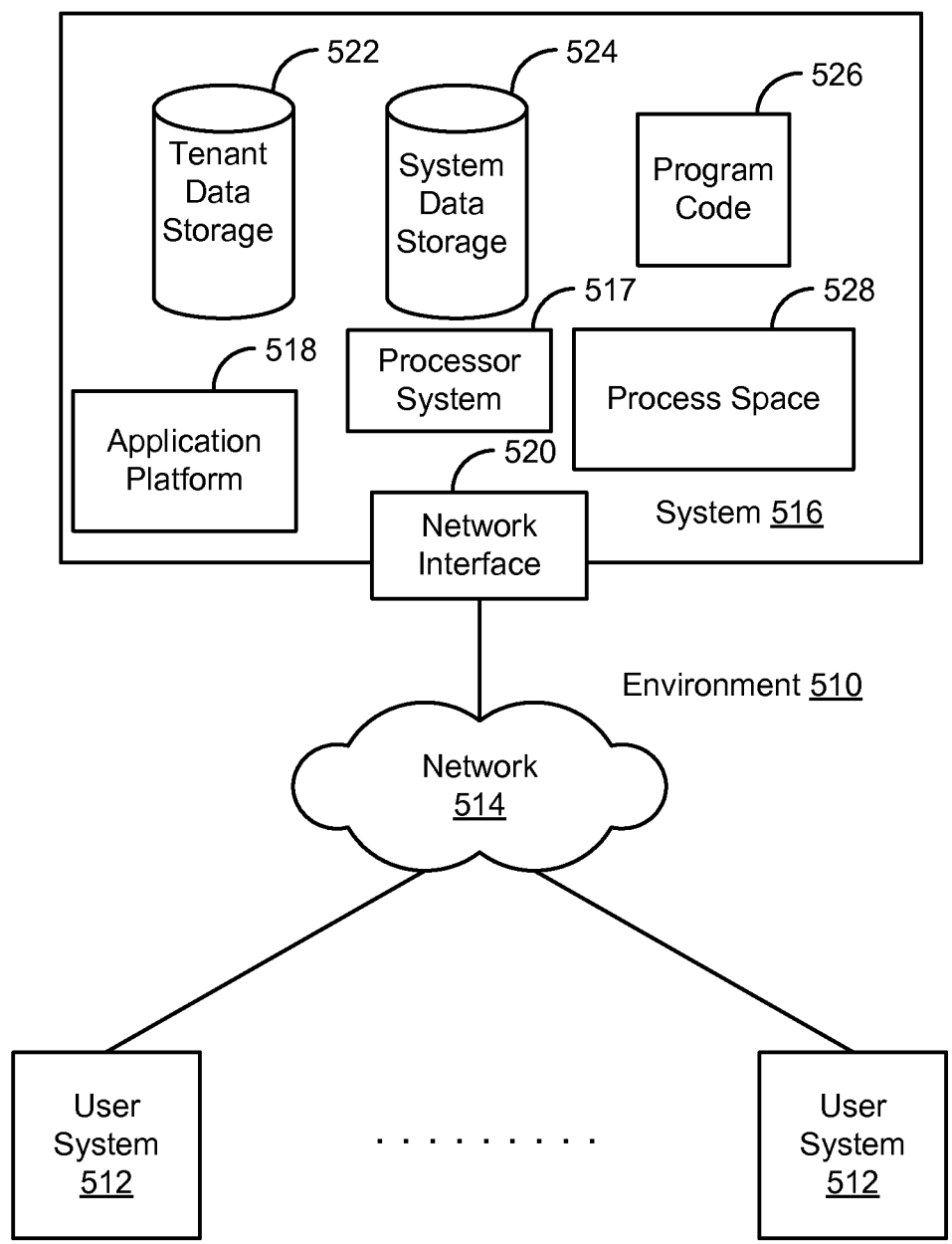
FIG. 5 illustrates a block diagram of an example of an environment wherein an on-demand database system might be used.

FIG. 5 illustrates a block diagram of an environment 510 wherein an on-demand database system might be used. Environment 510 may include user systems 512, network 514, system 516, processor system 517, application platform 518, network interface 520, tenant data storage 522, system data storage 524, program code 526, and process space 528. In other embodiments, environment 10 may not have all of the components listed and/or may have other elements instead of, or in addition to, those listed above.

Environment 510 is an environment in which an on-demand database system exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database system, which is system 516.

An on-demand database system, such as system 516, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database system 516 may include an application platform 518 that enables creation, managing and executing one or more applications developed by the provider of the on-demand database system, users accessing the on-demand database system via user systems 512, or third party application developers accessing the on-demand database system via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
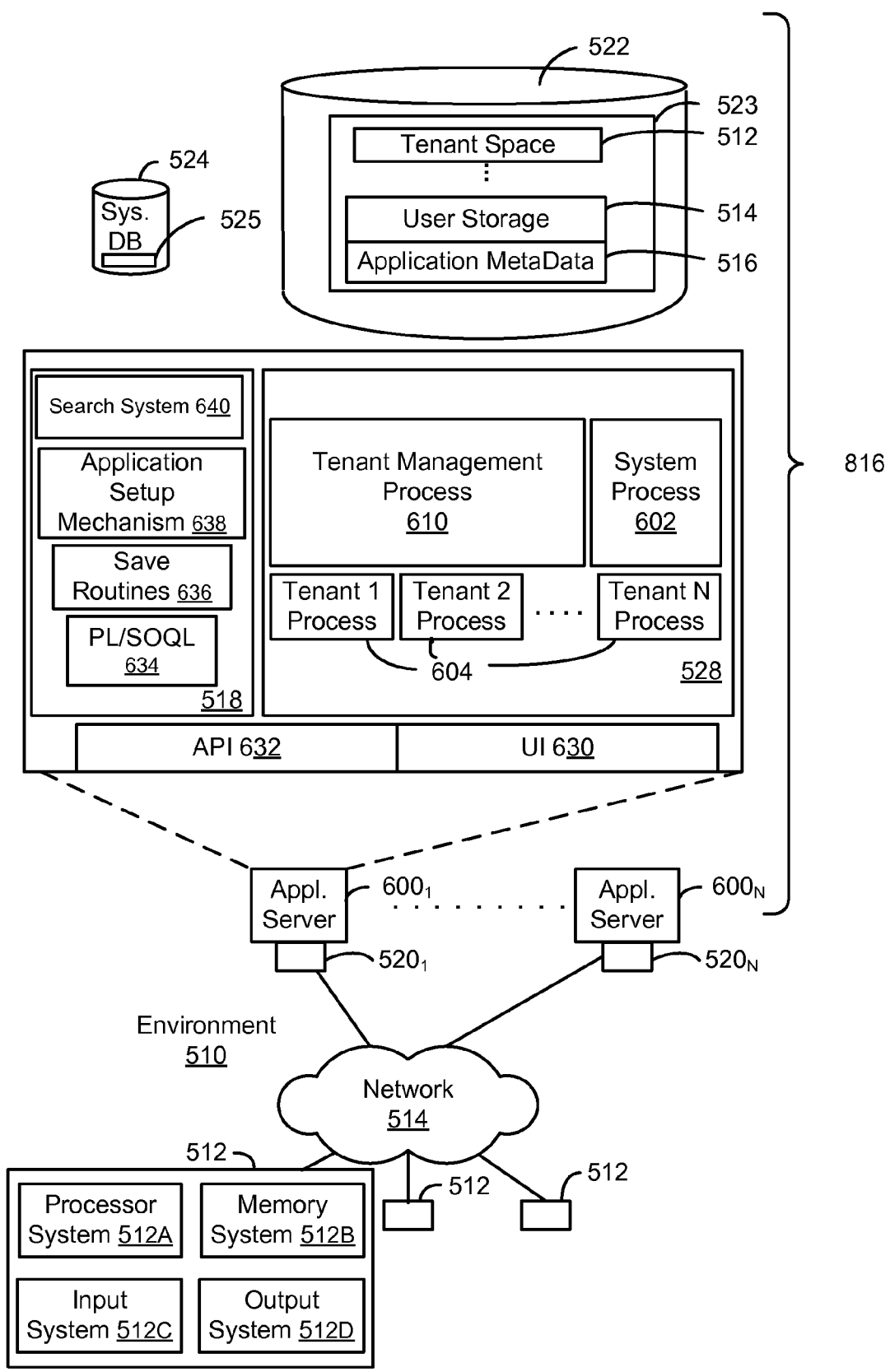
FIG. 6 illustrates a block diagram of an embodiment of elements of FIG. 9 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable recording medium having a program recorded thereon, the program including one or more sequences of instructions causing a computer to implement a method for creating a production application package and an updated production application package using a production instance of an organization of an on-demand database system and a non-production instance of the organization, the method comprising:
   providing the production instance of the organization of the on-demand database system, wherein the production instance of the organization has a first set of elements including organizational level features and associated with a creation of the production application package, the organizational level features including:
      organization settings,
      organization preferences, and
      organization permissions;
   creating the production application package for execution by the on-demand database system;
   storing the first set of elements;
   forming, from the production instance, the non-production instance of the organization in the on-demand database system for creating the updated production application package, the non-production instance of the organization being formed by:
      creating the non-production instance of the organization without all settings or permissions of the production instance of the organization,
      obtaining the stored first set of elements including one or more of the organizational level features of the production instance of the organization according to which the production application package has been created, and
      further creating the non-production instance of the organization by integrating at least one or more of the organizational level features of the obtained first set of elements into the non-production instance of the organization, such that the non-production instance of the organization replicates at least a partial development state of the production instance of the organization according to which the production application package has been created;

utilizing the non-production instance of the organization to develop and create the updated production application package for deployment; and deploying the updated production application package.

2. The non-transitory computer-readable recording medium of claim 1, wherein the first set of elements includes one or more version artifacts.

3. The non-transitory computer-readable recording medium of claim 1, wherein the first set of elements includes one or more custom objects associated with a version of the production application package.

4. The non-transitory computer-readable recording medium of claim 1, wherein the first set of elements includes one or more elements of metadata.

5. The non-transitory computer-readable recording medium of claim 1, wherein the first set of elements is extracted from the production instance of the organization and stored using an application programming interface (API).

6. The non-transitory computer-readable recording medium of claim 1, wherein the first set of elements includes features that the production application package depends on and that need to be specifically enabled in the production instance of the organization.

7. The non-transitory computer-readable recording medium of claim 1, wherein the first set of elements includes at least one license.

8. The non-transitory computer-readable recording medium of claim 1,
wherein the organization settings include one or more of currency settings and language settings,
wherein the organization preferences include an indication of whether a knowledge base is enabled, and
wherein the organization permissions include an indication of whether workflow permissions are enabled.

9. The non-transitory computer-readable recording medium of claim 1, wherein the method further comprises:
taking a snapshot of the first set of elements of the non-production instance of the organization after the creation of the updated production application package; and
storing the snapshot of the first set of elements in association with the updated production application package.

10. A method for creating a production application package and an updated production application package using a production instance of an organization of an on-demand database system and a non-production instance of the organization, the method comprising:
providing the production instance of the organization of the on-demand database system, wherein the production instance of the organization has a first set of elements including organizational level features and associated with a creation of the production application package, the organizational level features including:
organization settings,
organization preferences, and
organization permissions;
creating the production application package for execution by the on-demand database system;
storing the first set of elements;
forming, from the production instance, the non-production instance of the organization in the on-demand database system for creating the updated production application package, the non-production instance of the organization being formed by:
creating the non-production instance of the organization without all settings or permissions of the production instance of the organization;
obtaining the stored first set of elements including one or more of the organizational level features of the production instance of the organization according to which the production application package has been created, and
further creating the non-production instance of the organization by integrating at least one or more of the organizational level features of the obtained first set of elements into the non-production instance of the organization, such that the non-production instance of the organization replicates at least a partial development state of the production instance of the organization according to which the production application package has been created;
utilizing the non-production instance of the organization to develop and create the updated production application package for deployment; and
deploying the updated production application package.

11. The method of claim 10,
wherein the organization settings include one or more of currency settings and language settings,
wherein the organization preferences include an indication of whether a knowledge base is enabled, and
wherein the organization permissions include an indication of whether workflow permissions are enabled.

12. The method of claim 10, further comprising:
taking a snapshot of the first set of elements of the non-production instance of the organization after the creation of the updated production application package; and
storing the snapshot of the first set of elements in association with the updated production application package.

13. The method of claim 10, wherein the first set of elements includes one or more version artifacts.

14. The method of claim 10, wherein the first set of elements includes one or more custom objects associated with a version of the production application package.

15. The method of claim 10, wherein the first set of elements includes one or more elements of metadata.

16. The method of claim 10, wherein the first set of elements is extracted from the production instance of the organization and stored using an application programming interface (API).

17. The method of claim 10, wherein the first set of elements includes features that the production application package depends on and that need to be specifically enabled in the production instance of the organization.

18. The method of claim 10, wherein the first set of elements includes at least one license.

19. An apparatus for creating a production application package and an updated production application package using a production instance of an organization of an on-demand database system and a non-production instance of the organization, the apparatus comprising:
a processor for:
providing the production instance of the organization of the on-demand database system, wherein the production instance of the organization has a first set of elements including organizational level features and associated with a creation of the production application package, the organizational level features including:
organization settings,
organization preferences, and
organization permissions;

creating the production application package for execution by the on-demand database system;

storing the first set of elements;

forming, from the production instance, the non-production instance of the organization in the on-demand database system for creating the updated production application package, the non-production instance of the organization being formed by:
creating the non-production instance of the organization without all settings or permissions of the production instance of the organization,
obtaining the stored first set of elements including one or more of the organizational level features of the production instance of the organization according to which the production application package has been created, and
further creating the non-production instance of the organization by integrating at least one or more of the organizational level features of the obtained first set of elements into the non-production instance of the organization, such that the non-production instance of the organization replicates at least a partial development state of the production instance of the organization according to which the production application package has been created;

utilizing the non-production instance of the organization to develop and create the updated production application package for deployment; and deploying the updated production application package for deployment.

\* \* \* \* \*